United States Patent [19]

Yamazaki et al.

[11] Patent Number: 5,430,502
[45] Date of Patent: Jul. 4, 1995

[54] APPARATUS FOR ELIMINATING MOIRE PATTERN EFFECTS RESULTING FROM THE USE OF DIFFERENT DISPLAY RESOLUTION WITH A FIXED SIZE SHADOW MASK

[75] Inventors: Masao Yamazaki, Fujisawa; Tsutomu Kitamura, Tokyo, both of Japan

[73] Assignee: Matsushita Electric Industrial Co., Ltd., Kadoma, Japan

[21] Appl. No.: 22,035

[22] Filed: Feb. 24, 1993

[30] Foreign Application Priority Data

Feb. 25, 1992 [JP] Japan .................. 4-037487
Feb. 25, 1992 [JP] Japan .................. 4-037488

[51] Int. Cl.6 .............. H04N 5/21; H04N 3/16
[52] U.S. Cl. .................. 348/806; 348/524; 348/615; 315/370
[58] Field of Search ........ 348/806, 607, 615, 524, 348/578, 807; 315/370, 371; H04N 3/16, 5/21

[56] References Cited

U.S. PATENT DOCUMENTS

| | | | |
|---|---|---|---|
| 4,499,457 | 2/1985 | Hintze | 348/807 X |
| 4,533,855 | 8/1985 | Willis et al. | 315/370 |
| 4,859,915 | 8/1989 | Decraemer | 315/370 |
| 4,887,010 | 12/1989 | Fujimura | 315/370 |
| 5,107,188 | 4/1992 | Rindal | 348/524 X |

FOREIGN PATENT DOCUMENTS

| | | | |
|---|---|---|---|
| 3306879 | 8/1984 | Germany | H04N 3/16 |
| 54-148423 | 11/1979 | Japan | H04N 3/16 |
| 63-275284 | 11/1988 | Japan | H04N 9/18 |
| 2062401 | 5/1981 | United Kingdom | H04N 5/44 |

*Primary Examiner*—Victor R. Kostak
*Assistant Examiner*—John W. Miller
*Attorney, Agent, or Firm*—Cushman, Darby & Cushman

[57] ABSTRACT

In a vertical deflection circuit of a display monitor including a vertical deflection coil 41 and a sigmoid correction capacitor 42 connected to the vertical deflection coil 41, a series connection circuit consisting of a resistor 21 and a switch 22 connected in series with each other is connected in parallel with the sigmoid correction capacitor 42. By turning the switch 22 on and off in response to a control signal having a period twice as long as a period of the vertical synchronizing signal, a current flowing through the resistor 21 and the switch 22 is periodically added to a vertical deflection current, thereby causing shift of displaying points on a screen to make the moire phenomenon unnoticeable.

21 Claims, 6 Drawing Sheets

APPARATUS FOR ELIMINATING MOIRE PATTERN EFFECTS RESULTING FROM THE USE OF DIFFERENT DISPLAY RESOLUTION WITH A FIXED SIZE SHADOW MASK

FIELD OF THE INVENTION AND RELATED ART STATEMENT

1. Field of the Invention

The present invention relates to a moire cancel circuit for reducing the vertical moire phenomenon on a screen of a raster-scanning type display monitor in which a cathode ray tube is used.

2. Description of the Related Art

In recent years, with the spread of personal computers etc., there have arisen various requests for a display monitor for displaying data. For example, various different dot-numbers are needed for the horizontal and vertical directions of the display monitor, and various display sizes are needed for the display monitor. Furthermore, it is required for one display monitor that a display mode can be selected from among plural modes of the dot-number and the display size.

Figure 6:
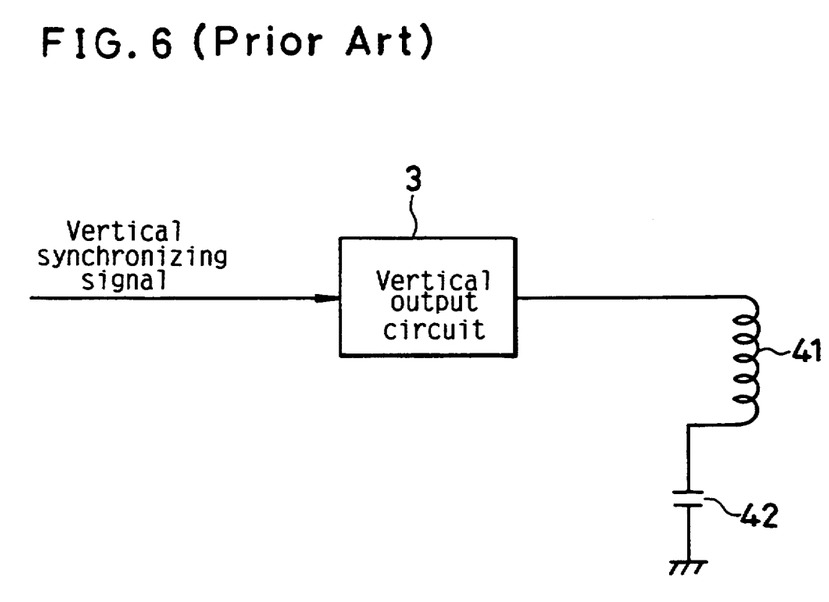
FIG. 6 is a circuit diagram showing the conventional vertical deflection circuit.

FIG. 6 is a block diagram showing the conventional vertical deflection circuit. A vertical synchronizing signal is input to a vertical output circuit 3. An output of the vertical output circuit 3 is supplied to a horizontal deflection coil 41 to which a sigmoid correction capacitor 42 is connected. Description of operation in the vertical deflection circuit is omitted because it is irrelevant to the subject matter of the present invention described later.

In a TV set, the number of scanning lines, which corresponds to a vertical displaying dot-number, is specified in accordance with broadcast systems, and a display size is fixed in accordance with a size of a CRT. An aperture pitch on a shadow mask is designed with respect to the vertical dot pitch so as not to generate the moire. However, the display monitor for computers etc. has to be able to display data with arbitrary display size and arbitrary dot-number. This means that several values are needed for each of the vertical display size (L), the vertical dot number (N) and the vertical dot pitch (d), which satisfy the predetermined relation (L/N=d), on condition that the vertical aperture pitch is fixed to a specific value. Since it is difficult to prepare such various values for the fixed vertical aperture pitch, the conventional art is confined to the following several approximations:

(1) when a pitch of the scanning line, hence the vertical dot pitch is changed by changing a size of the image display area, degree of the moire generated by cross interference between the vertical dot pitch and the aperture pitch of the shadow mask can be reduced;

(2) when an aperture pitch in the vertical direction of the shadow mask is changed, degree of the moire generated by the cross interference against the scanning line pitch can be reduced; and (3) when the scanning line is made bold by blurring a focus, contrast (shading) of the moire pattern can be softened, thereby making the moire pattern unnoticeable.

However, the above-mentioned conventional moire reduction methods have the following shortcomings:

i) since a vertical length of the image display area can be changed within only a small range, degree of the moire reduction is very low;

ii) since production of the display monitor is of small amount in comparison with the TV set which is mass-produced, it is impossible with respect to cost to change the aperture pitch of the shadow mask;

iii) since the display monitor needs a resolution very much higher than the TV set, it is quite undesirable to change the focus for the worse;

iv) since a multi-scanning type display monitor applicable to plural displaying dot numbers and plural modes of the displaying size is often needed, it becomes more difficult to overcome the above-mentioned shortcomings; and v) since the use of a display monitor controlled by a microcomputer has increased in recent years, it has been strongly required to carry out all the controls with DC voltages which are suitable for the microcomputer.

OBJECT AND SUMMARY OF THE INVENTION

An object of the present invention is to offer a moire cancel circuit which is capable of reducing the moire and minimizing deterioration of resolution in all display modes of the display monitor, and which can be controlled with DC voltage to be suitable for the control by a microcomputer.

In order to achieve the above-mentioned object, the moire cancel circuit of the present invention comprises:

a sigmoid correction capacitor connected to one end of a vertical deflection coil;

a vertical output circuit for supplying the vertical deflection coil with a vertical deflection current in accordance with a vertical synchronizing signal, the vertical output circuit being connected to the other end of the deflection coil;

a dividing circuit for making a control signal having a period twice as long as a period of the vertical synchronizing signal; and a vertical position shift circuit connected in parallel with the sigmoid correction capacitor, the vertical position shift circuit comprising a resistor and switching means which is connected in series to the resistor and is turned on and off in response to the control signal.

According to the above-mentioned moire cancel circuit, the moire phenomenon can be made unnoticeable over all the screen independent of an aperture pitch of a shadow mask of a CRT, displaying area of image and variety of displaying modes (dot number etc.) of a display monitor. Moreover, deterioration of resolution can be minimized, and the structure of the circuit is simple. Therefore, in a multi-scanning type display monitor, speed-up of the development is drastically progressed; a development cost is very low; and quality of image is improved.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENTS

Hereafter, a preferred embodiment of the present invention is described with reference to the accompanying drawings.

Figure 1:
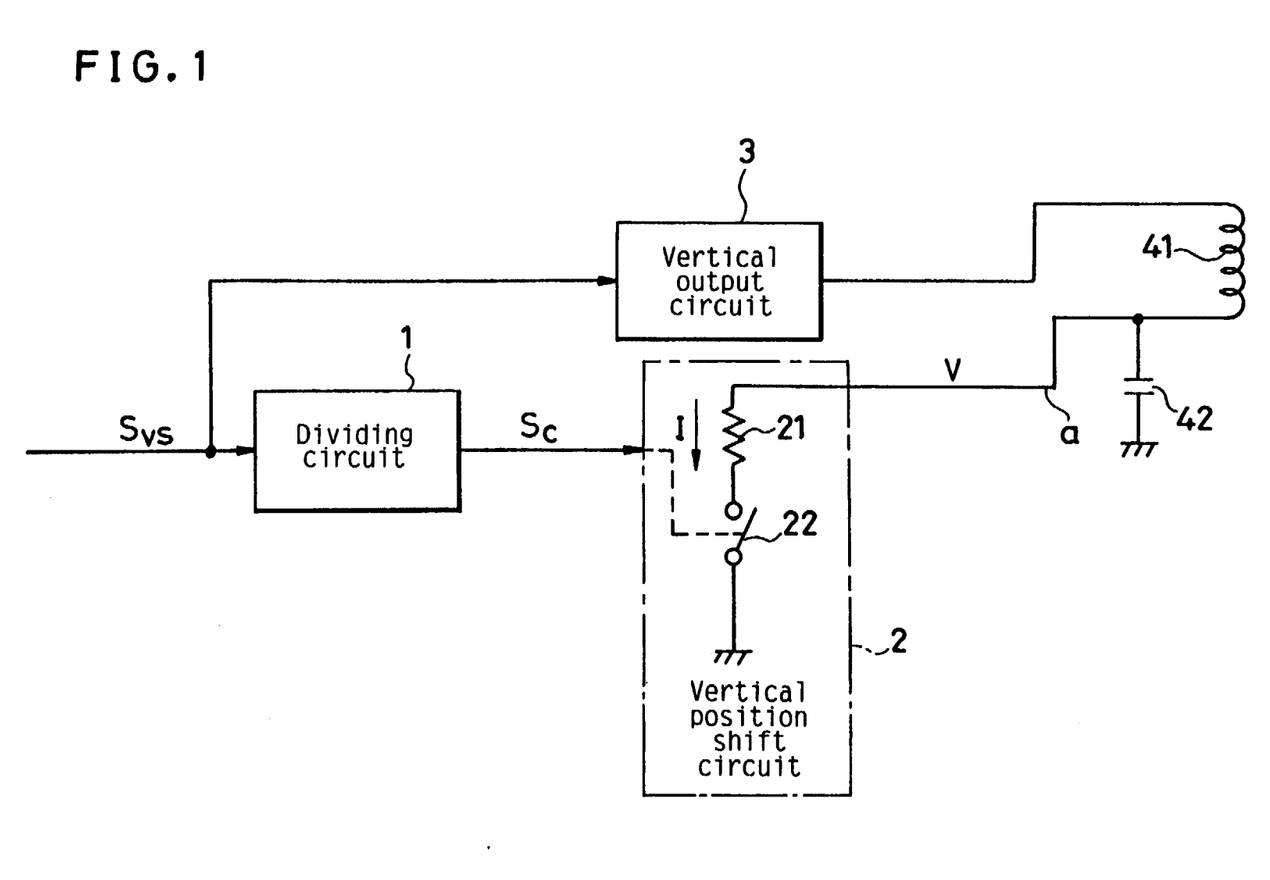
FIG. 1 is a block diagram showing a principle of operation of a first embodiment.
Figure 2:
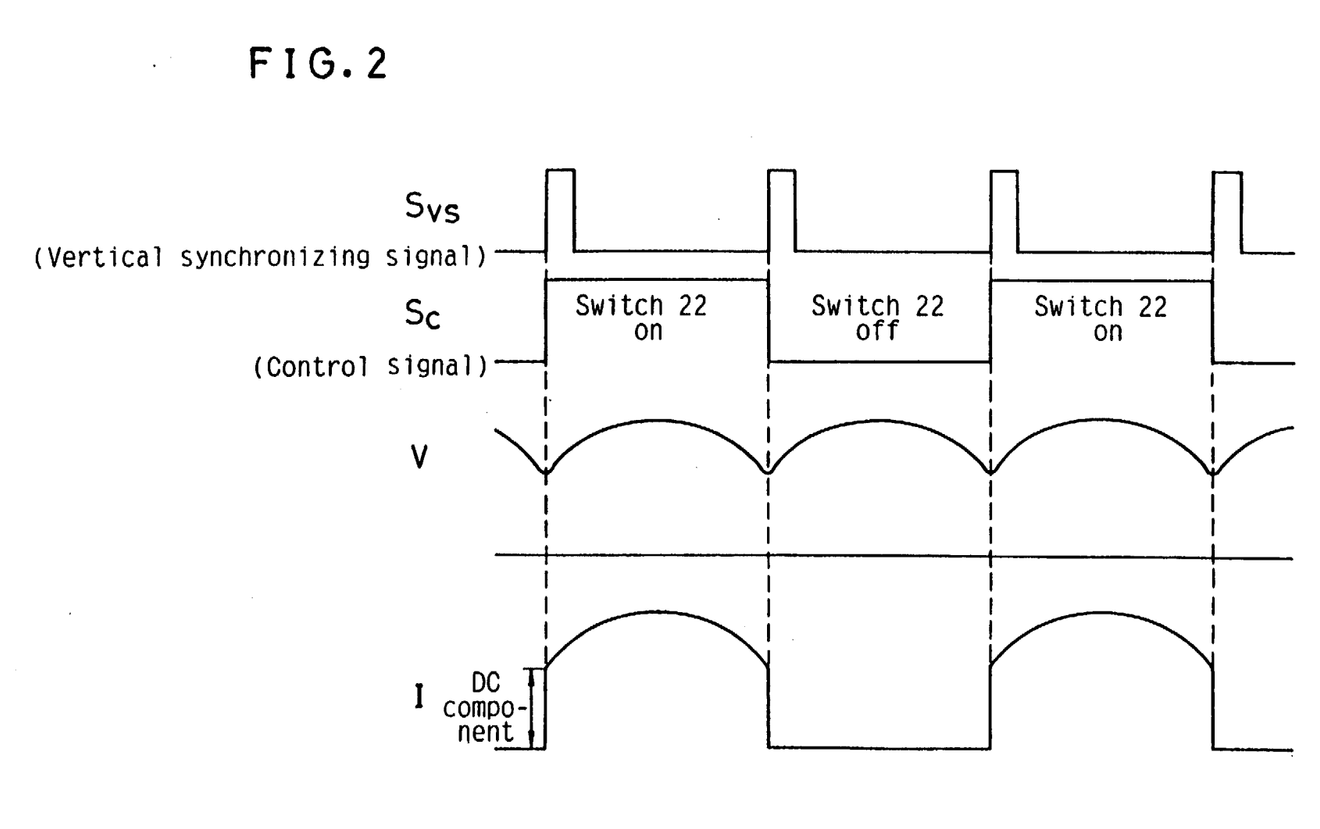
FIG. 2 is a time chart showing waveforms of signals which are commonly referred to in the description of the present invention.

FIG. 1 is a block diagram showing a principle of operation of a first embodiment. FIG. 2 is a time chart showing waveforms of signals on a circuit shown in FIG. 1. In FIG. 1, a vertical synchronizing signal $S_{vs}$ (as shown in FIG. 2) is input to a dividing circuit 1. The dividing circuit 1 makes a control signal $S_c$ (as shown in FIG. 2) having a period twice as long as a period of the vertical synchronizing signal $S_{vs}$ and supplies the control signal $S_c$ to a vertical position shift circuit 2. The vertical position shift circuit 2 consists of a resistor 21 and a switch 22. Also, the vertical synchronizing signal $S_{vs}$ is input to a vertical output circuit 3, and the vertical output circuit 3 supplies a vertical deflection coil 41 with a vertical deflection current. A sigmoid correction capacitor 42 and the vertical position shift circuit 2 are connected to one end of the vertical deflection coil 41. In the position shift circuit 2, the switch 22 is opened/closed in response to the control signal $S_c$. When the switch 22 is on (closed), a current flows; through the resistor 21. When the switch 22 is off (open), no current flows through the resistor 21. As a result, a current I shown in FIG. 2 flows in the resistor 21. This current I is added to the vertical deflection current. Addition of the current I causes a phenomenon that a displaying position of an image shifts up and down at every vertical period of the vertical synchronizing signal $S_{vs}$. As a result, a contrast (shading) of the moire is weakened, thereby reducing the moire on the image. Since a screen of a modern CRT is fairly flat rather than spherical, deflection amount per a constant deflection current increases toward edges of the screen from the center of the screen. Therefore, to evenly reduce the moire on the image, the current added to the vertical deflection current has to be large in the center of the screen and small in the edges of the screen.

In FIG. 1, when the switch 22 is on, the resistor 21 is connected in parallel with the sigmoid correction capacitor 42. A capacitance of the sigmoid correction capacitor 42 is selected to have a predetermined value so that a voltage V (as shown in FIG. 2) having a parabola waveform, which corresponds to curvature of the screen of the CRT, can be generated across the sigmoid correction capacitor 42 (at a point "a"). The current I added to the vertical deflection current is thus made parabola shape periodically as shown in FIG. 2. As a result, the current I is made largest when an electron beam is scanning in the center of the screen and gradually lowers toward upper and lower edges, thereby evenly reducing the vertical moire over all the image without any special modulation circuit.

In the above-mentioned structure, a shift pitch of the displaying position in the up or down direction is only a minute value less than an interval between the scanning lines. A resistance of the resistor 21 is selected to generate a proper shift pitch for obtaining the optimum condition to reduce the moire.

Figure 3:
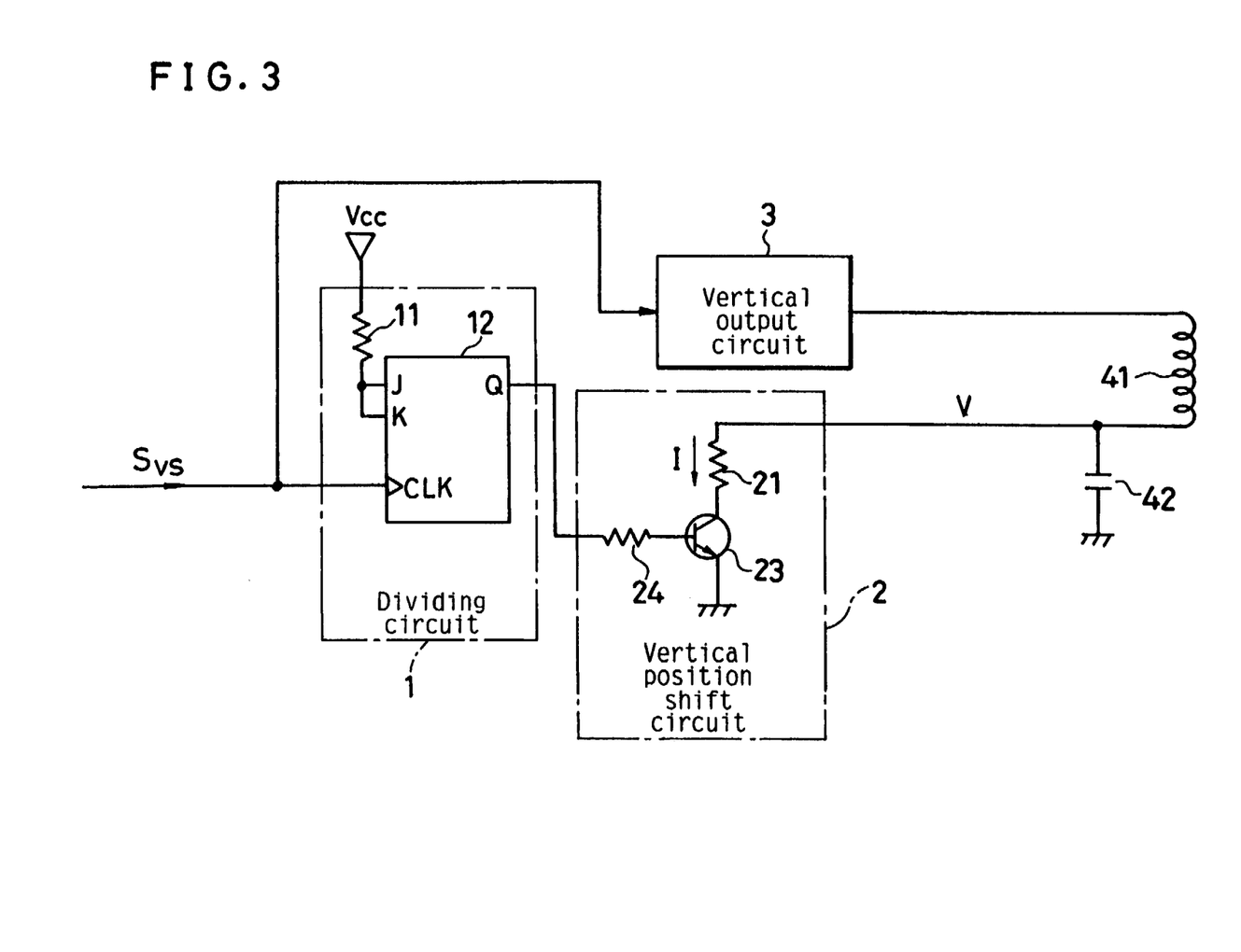
FIG. 3 is a circuit diagram showing a concrete circuit of the first embodiment.

FIG. 3 is a circuit diagram showing a concrete circuit of the first embodiment. The vertical position shift circuit 2 consists of resistors 21, 24 and an NPN transistor 23 which corresponds to the switch 22 of FIG. 1. The dividing circuit i consists of a resistor 11 and a flip-flop 12 as an example circuit in which the output state is reversed in accordance with a clock signal (i.e., the vertical synchronizing signal). The vertical synchronizing signal $S_{vs}$ is also input to the vertical output circuit 3, and a vertical output current issued from the vertical output circuit 3 is supplied to the vertical deflection coil 41 to which the sigmoid correction capacitor 42 is connected.

Operation of the above-mentioned circuit is described with reference to FIGS. 2 and 3. An output Q of the flip-flop 12 is reversed in state in response to the clock signal. Since the clock signal is actually the vertical synchronizing signal $S_{vs}$ as shown in FIG. 2, the output Q of the flip-flop 12 is alternately made high and low at every vertical period to thereby act as the control signal $S_c$ shown in FIG. 2. The output Q of the flip-flop 12 is supplied to the base of the NPN transistor 23 by way of the resistor 24. When the output Q of the flip-flop 12 is high, the NPN transistor 23 turns on, and thereby the current having the parabola-shaped waveform flows through the resistor 21 and the NPN transistor 23. The current is thus added to the vertical deflection current. When the output Q of the flip-flop 12 is low, the NPN transistor 23 turns off. Therefore, no current flows through the resistor 21, and no current is added to the vertical deflection current. Thus, the current I as shown in FIG. 2 is obtained. When the current I is added to the vertical deflection current, a displaying position of the image shifts on the screen. Therefore, the displaying position of the image relatively shifts up and down in the vertical direction. The moire on the screen is thereby reduced. Since the current added to the vertical deflection current varies in response to a resistance of the resistor 21, the moire can be made unnoticeable in any mode of the display monitor by selecting a proper resistance for the resistor 21.

When the display monitor of a 17-inch type CRT has a vertical screen length of 220 mm and an aperture pitch of 0.28 mm, a vertical dot pitch for handling 600 dots (i.e., 600 scanning lines) is 0.368 (=200/600) mm. In such a display monitor, the vertical moire is canceled by an up and down shift of the scanning line by only about 0.06 mm, whereas a diameter of an electron beam spot is about 0.6 mm. Thus, since the shift amount (=0.06 mm) is only ten percent of the diameter of the electron beam spot, the vertical resolution gets little influence by the vertical shifts of tile scanning line.

The moire cancel circuit is not limited to the circuit shown in FIG. 3. The essential point is that the current, which lowers toward the up and down edges of the screen from the center of the screen, is periodically added to the vertical deflection current, thereby shifting a displaying position at every period twice as long as the vertical period to evenly reduce the moire over all the screen.

Figure 4:
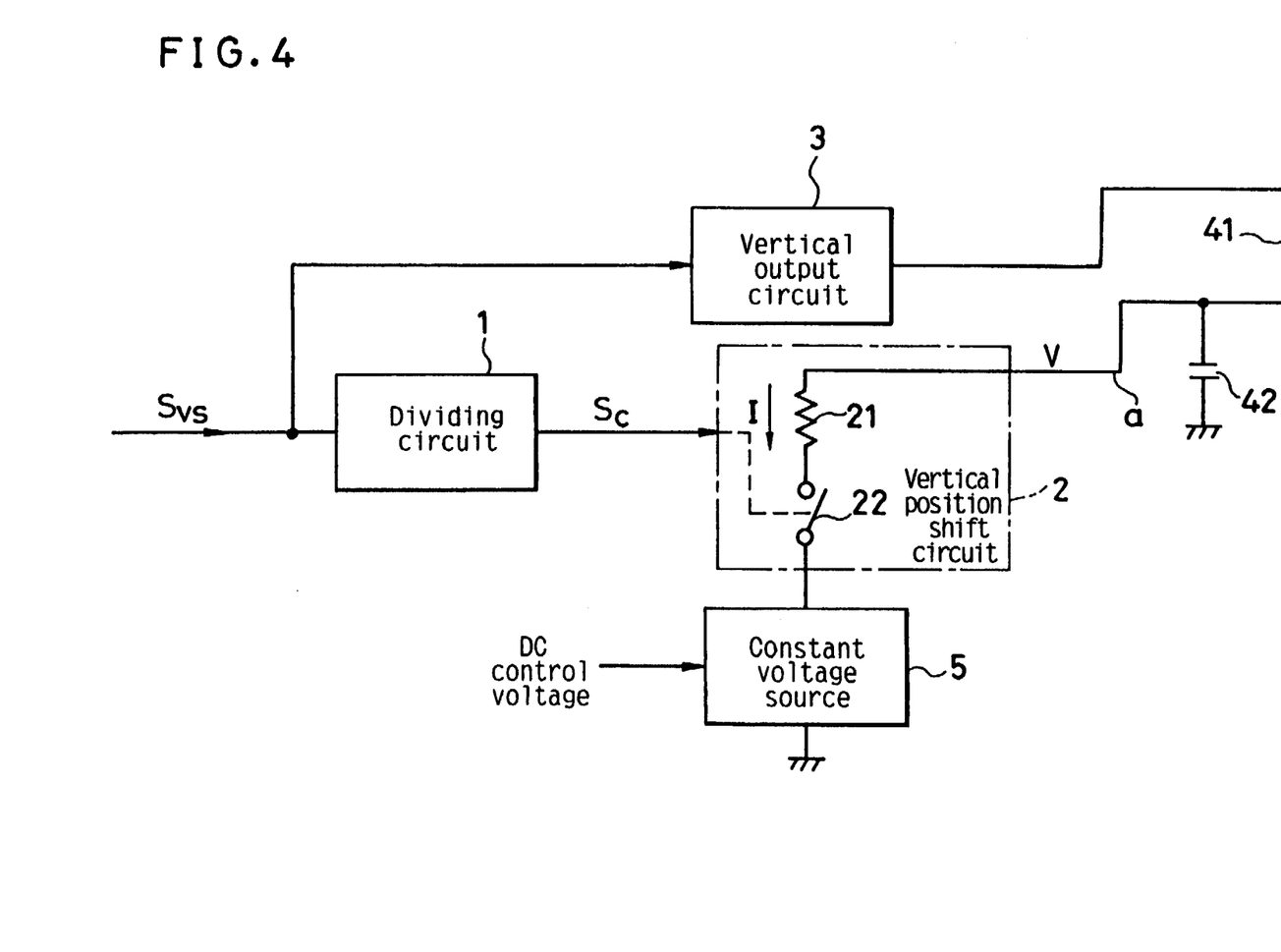
FIG. 4 is a block diagram showing a principle of operation of a second embodiment.

FIG. 4 is a block diagram showing a principle of another embodiment. This moire cancel circuit is controllable with DC voltage. Corresponding parts and components to the first embodiment are shown with the same numerals and marks, and the description thereon made in the first embodiment is similarly applied. A difference of this second embodiment from the first embodiment is the provision of a constant voltage source 5 connected to the vertical position shift circuit 2. An output voltage of the constant voltage source 5 is controllable with DC voltage. Hereafter, operation of the moire cancel circuit shown in FIG. 4 is described with reference to FIG. 2.

The vertical synchronizing signal $S_{vs}$ (FIG. 2) is input to the dividing circuit 1. The dividing circuit 1 issues the control signal $S_c$ (FIG. 2) having a period twice as long as the vertical period. In the vertical position shift circuit 2, the switch 22 is turned on or off in response to the control signal $S_c$. When the switch 22 is on, a differential voltage between the voltage at the point "a" (FIG. 4) and an output voltage of the constant voltage source 5 is applied between both end of the resistor 21, and a current flows in the resistor 21. When the switch 22 is off, no current flows in the resistor 21. Thus, the current I (FIG. 2) is added to the vertical deflection current. When the output voltage of the constant voltage source 5 varies by varying DC control voltage, the voltage applied to the resistor 21 at an on-time of the switch 22 varies. Therefore, a DC component of the current I (FIG. 2) added to the vertical deflection current varies, thereby varying a shift amount of the image. The current added to the vertical deflection current has a parabola-shaped waveform such that the current is made large in the center of the screen and gradually lowers toward the edges of the screen from the center. The moire is thus reduced evenly over all the screen. A shift pitch of the displaying position in the up and down directions is only a minute value less than an interval between the scanning lines. The output voltage of the constant voltage source 5 is selected by controlling the DC voltage to generate a proper shift pitch for obtaining the optimum condition to reduce the moire.

Figure 5:
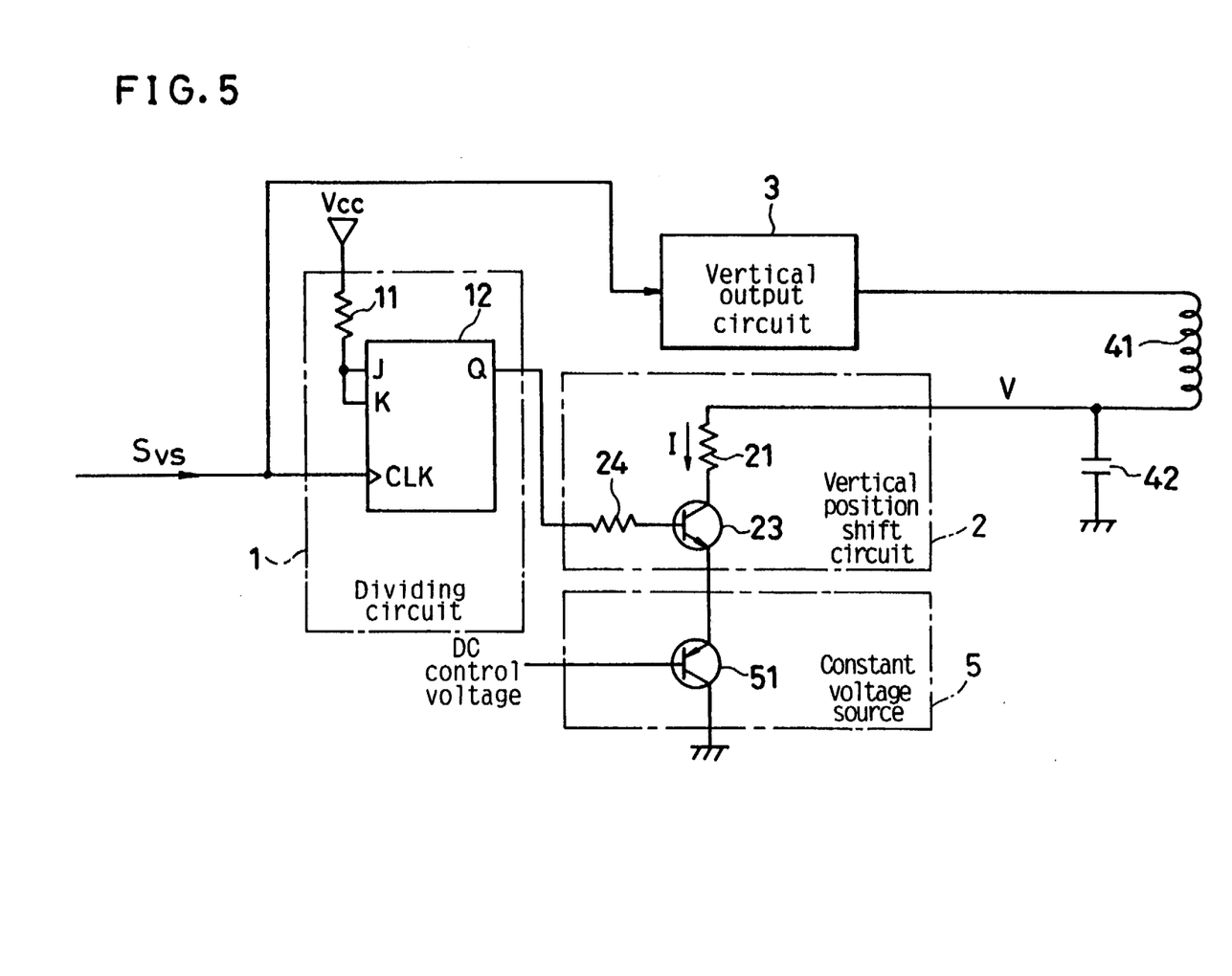
FIG. 5 is a circuit diagram showing a concrete circuit of the second embodiment.

FIG. 5 is a circuit diagram showing a concrete circuit of the second embodiment. The vertical position shift circuit 2 consists of resistors 21, 24 and an NPN transistor 23 which corresponds to the switch 22 of FIG. 4. The dividing circuit 1 consists of a resistor 11 and a flip-flop 12. The flip-flop 12 may be replaced by any other known circuit in which logic of output is reversed in accordance with a clock signal (i.e., the vertical synchronizing signal). The constant voltage source 5 consists of a PNP transistor 51 whose base receives a DC control voltage.

Operation of the above-mentioned circuit is described with reference to FIGS. 2 and 5. An output Q of the flip-flop 12 is reversed in the state in response to the clock signal. Since the clock signal is actually the vertical synchronizing signal $S_{vs}$ as shown in FIG. 2, the output Q of the flip-flop 12 is alternately made high and low at every vertical period as the control signal $S_c$ shown in FIG. 2. The output Q of the flip-flop 12 is supplied to the base of the NPN transistor 23 by way of the resistor 24. The DC control voltage, which is applied to the base of the PNP transistor 51, is selected to have a value within a range in which the NPN transistor 23 and the PNP transistor 51 turn on when the output Q of the flip-flop 12 is high. When the output Q of the flip-flop 12 is high, the NPN transistor 23 and the PNP transistor 51 turn on, and thereby the current having the parabola shaped waveform flows through the resistor 21, the NPN transistor 23 and the PNP transistor 51. The current is thus added to the vertical deflection current. When the output Q of the flip-flop 12 is low, the NPN transistor 23 turns off. Therefore, no current flows through the resistor 21, and no current is added to the vertical deflection current. Thus, the current I as shown in FIG. 2 is added to the vertical deflection current. When the current I is added to the vertical deflection current, a displaying position of the image shifts on the screen. Therefore, the displaying position of the image relatively shifts up and down in the vertical direction. The moire on the screen is thereby reduced. The current added to the vertical deflection current has a value dependent on a resistance of the resistor 21 and a voltage appearing between both ends of the resistor 21. Since the voltage applied across the resistor 21 at the time when the output Q of the flip-flop 12 is high depends on the DC control voltage applied to the base of the PNP transistor 51, a shift amount of the displaying position can be controlled by the DC control voltage applied to the base of the PNP transistor 51. The moire is thus made most unnoticeable by adjustment of the DC control voltage.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A moire cancel circuit comprising:
   a vertical deflection coil;
   a sigmoid correction capacitor having one end connected to a first end of said vertical deflection coil;
   a vertical output circuit for supplying said vertical deflection coil with a vertical synchronizing signal, an output of said vertical output circuit being connected to a second end of said deflection coil;
   a dividing circuit for making a control signal having a period twice as long as a period of said vertical synchronizing signal; and
   a vertical position shift circuit connected in parallel with said sigmoid correction capacitor, said vertical position shift circuit comprising a resistor and means for switching which is connected in series with said resistor and is turned on and off in response to said control signal to shift said output of said vertical output circuit during substantially an entire display frame.

2. The moire cancel circuit of claim 1, wherein said vertical output shifting means comprises potential generating means for selectively generating a signal having one of a plurality of different voltage levels as said second potential.

3. A moire cancel circuit comprising:
   a vertical deflection coil;
   a sigmoid correction capacitor having one end connected to a first end of said vertical deflection coil;
   a vertical output circuit for supplying said vertical deflection coil with a vertical synchronizing signal, an output of said vertical output circuit being connected to a second end of said deflection coil;
   a dividing circuit for making a control signal having a period twice as long as a period of said vertical synchronizing signal;

a vertical position shift circuit connected to said first end of said vertical deflection coil, said vertical position shift circuit comprising a resistor and means for switching which is connected in series with said resistor and is turned on and off in response to said control signal to shift said output of said vertical output circuit during substantially an entire display frame; and a constant voltage source connected in series with said vertical position shift circuit, said constant voltage source controlling an output voltage thereof by a DC control voltage.

4. A moire cancel circuit for a cathode ray tube, said circuit comprising:

a vertical deflection coil;

vertical output means for receiving a vertical synchronizing signal at an input and for applying said vertical deflection coil driving signal to a first terminal of said vertical deflection coil to drive said vertical deflection coil; and vertical output shifting means for receiving said vertical synchronizing signal at an input and selectively applying, to a second terminal of said vertical deflection coil, a first potential and a second potential different from said first potential, thereby shifting a potential difference across said vertical deflection coil during an substantially an entire display frame.

5. The moire cancel circuit of claim 4, said vertical output shifting means comprises:

a dividing circuit for receiving said vertical synchronizing signal at an input and for generating an output signal having a period one half that of said vertical synchronizing signal; and a vertical position shift circuit for receiving said dividing circuit output signal and for selectively placing a resistor in series with said vertical deflection coil responsive to said dividing circuit output signal to thereby generate said second potential difference.

6. The moire cancel circuit of claim 5, wherein:

said resistor has a first terminal connected to said second terminal of said vertical deflection coil; and said vertical position shift circuit includes a switch responsive to said dividing circuit output for connecting a second terminal of said dividing circuit to a fixed potential.

7. The moire cancel circuit of claim 6, wherein:

said fixed potential is generated by a constant voltage source responsive to a control voltage applied thereto.

8. The moire cancel circuit of claim 7, wherein said constant voltage source comprises a transistor.

9. The moire cancel circuit of claim 5, wherein said dividing circuit comprises a flip-flop.

10. The moire cancel circuit of claim 5, wherein said switch comprises a transistor.

11. The moire cancel circuit of claim 4, wherein:

said first potential applied to said second terminal of said vertical deflection coil is generated using a capacitor; and said second potential applied to said second terminal of said vertical deflection is generated using an RC circuit.

12. The moire cancel circuit of claim 11, wherein said capacitor also is used in said RC circuit.

13. The moire cancel circuit of claim 4, wherein said second potential has a parabolic form.

14. The moire cancel circuit of claim 13, wherein said parabolic form has a vertex intermediate rising edges of said vertical synchronizing signal.

15. A method of cancelling moire patterns on a cathode ray tube, said method comprising the steps of:

applying a driving voltage to a vertical deflection coil responsive to a vertical synchronizing signal;

periodically applying a vertical deflection shifting current to said vertical deflection coil responsive to said vertical synchronizing signal during substantially an entire display frame to selectively shift lines displayed on said cathode ray tube.

16. The method of claim 15, wherein said periodic applying step applies said current to said coil at a one half a frequency of said vertical synchronizing signal.

17. The method of claim 15, wherein said periodic applying step comprises the steps of:

generating a control signal by dividing a frequency of said vertical synchronizing signal by two; and applying said vertical deflection shifting current to said vertical deflection coil responsive to said control signal.

18. The method of claim 17, wherein said generating step comprises a step of using a flip-flop to output said control signal.

19. The method of claim 15, wherein said periodic applying step comprises a step of generating said vertical deflection-shifting circuit as a parabolically shaped waveform.

20. The method of claim 15, wherein said periodic applying step comprises a step of selectively connecting a resistor in parallel with a capacitor connected to said vertical deflection coil, thereby forming an RC circuit.

21. The method of claim 15, further comprising a step of generating a signal having one of a plurality of predetermined voltage levels as said vertical deflection shifting current.

* * * * *